United States Patent
Kassovski et al.

(10) Patent No.: US 9,267,847 B2
(45) Date of Patent: Feb. 23, 2016

(54) INFRARED SENSOR WITH SENSOR TEMPERATURE COMPENSATION

(71) Applicant: MELEXIS TECHNOLOGIES NV, Tessenderlo (BE)

(72) Inventors: Viktor Kassovski, Sofia (BG); Luc Buydens, Kasterlee (BE); Sam Maddalena, Zelem (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 14/744,410

(22) Filed: Jun. 19, 2015

(65) Prior Publication Data
US 2015/0369669 A1 Dec. 24, 2015

(30) Foreign Application Priority Data
Jun. 19, 2014 (GB) .................................. 1410958.1

(51) Int. Cl.
*G01J 5/02* (2006.01)
*G01J 5/12* (2006.01)
*G01J 5/08* (2006.01)
*G01J 5/00* (2006.01)

(52) U.S. Cl.
CPC .................. *G01J 5/12* (2013.01); *G01J 5/0803* (2013.01); *G01J 2005/0048* (2013.01)

(58) Field of Classification Search
CPC .............. H01L 31/09; G01J 5/02; G01J 5/08; G01J 5/12; G01J 5/045
See application file for complete search history.

(56) References Cited

U.S. PATENT DOCUMENTS

| 5,695,283 | A | 12/1997 | Johnson |
| 5,721,430 | A * | 2/1998 | Wong ....................... 250/339.13 |
| 6,043,493 | A | 3/2000 | Kim et al. |
| 6,236,046 | B1 | 5/2001 | Watabe et al. |
| 6,300,554 | B1 * | 10/2001 | Du et al. ........................ 136/201 |
| 6,565,254 | B2 * | 5/2003 | Sato et al. ...................... 374/132 |

(Continued)

FOREIGN PATENT DOCUMENTS

| EP | 0913675 A1 | 5/1999 |
| EP | 1953513 A1 | 8/2008 |

(Continued)

OTHER PUBLICATIONS

GB Search Report from corresponding GB Application No. 1410958. 1, Dec. 17, 2014.

(Continued)

*Primary Examiner* — Marcus Taningco
(74) *Attorney, Agent, or Firm* — Workman Nydegger

(57) ABSTRACT

An infrared sensor for temperature sensing comprises a cap covering a substrate; an IR-radiation filtering window in the cap transparent to IR radiation; a first sensing element comprising a set of N thermocouples on the substrate covered by the cap, whose hot junctions may receive radiation; a second sensing element comprising a set of N thermocouples on the substrate covered by the cap whose hot junctions may not receive radiation; first connection modules for connecting a number N1 of thermocouples of the first sensing element, second connection modules for connecting a number N2 of thermocouples of the second sensing; connecting means for connecting an output of the first connection modules of the first sensing element with an output of the second connection modules of the second sensing element, and an output of the combined outputs of the sensing elements.

14 Claims, 5 Drawing Sheets

(56) References Cited

U.S. PATENT DOCUMENTS

| | | | |
|---|---|---|---|
| 8,552,380 B1* | 10/2013 | Florin et al. | 250/338.4 |
| 2004/0187904 A1* | 9/2004 | Krellner et al. | 136/213 |
| 2015/0177069 A1* | 6/2015 | Maes et al. | 250/338.3 |
| 2015/0177070 A1* | 6/2015 | Maes et al. | 250/338.3 |

FOREIGN PATENT DOCUMENTS

| | | | |
|---|---|---|---|
| EP | 1972911 | A2 | 9/2008 |
| EP | 2172753 | A1 | 4/2010 |
| JP | H 11-258040 | A | 9/1999 |

OTHER PUBLICATIONS

Extended European Search Report from corresponding EP Application No. 15172758.3, Dec. 17, 2015.

* cited by examiner

INFRARED SENSOR WITH SENSOR TEMPERATURE COMPENSATION

FIELD OF THE INVENTION

The present invention relates to the field of temperature sensors. More specifically it relates to an infrared sensor with detection of sensor temperature.

BACKGROUND OF THE INVENTION

The temperature of an object may be measured by measuring the amount of infrared radiation emitted by heat sources. The emission of infrared (IR) radiation is higher with increase of source temperature. In traditional IR temperature sensors, the sensor is provided with a shielding cap which filters infrared radiation for transmission, blocking the rest. For instance, visible light may be blocked by a silicon filter, which lets substantially solely IR radiation pass. The IR radiation may be emitted by an object of interest, which is a heat source.

The shielding cap is typically thermally isolated from the sensing element, for instance by leaving a spatial gap of air or vacuum between the cap and the sensing element. The IR radiation is then collected by the sensing element, which heats up due to the collected energy. This sensing element may for example be a radiation absorbing membrane. The heating results in a temperature change. This temperature change is detected, for example by the hot contact of a thermocouple. The difference of temperature between the sensing element and a reference produces a readable electrical voltage signal which depends on the amount of IR radiation received from the object of interest (and hence, of the temperature of the object of interest). In the case of thermocouples, the reference is provided by a cold contact. The difference of temperature between the hot contact (the sensing element) and cold contact (the reference) creates a small voltage, which can be read as a measurement value for the amount of heat, emitted from the heat source, entering the detector. Hence the measurement value of the voltage is a value representative for the temperature of the heat source.

Normally the hot contact is attached to a membrane which absorbs the infrared radiation and the cold contact is attached to the bulk matrix of the device. Several factors contribute to errors in the measurement. The sensing element may receive parasitic signals from sources other than the object of interest, for instance from the detector housing. The increase of the reference temperature may also affect the measurement. In case of thermocouples, the bulk reference temperature may increase (for instance, due to environmental conditions) and create an offset, thus diminishing the accuracy of the measurement. Document U.S. Pat. No. 6,236,046 shows a detector comprising a first substrate, an active primary sensing element and a cap with a window allowing IR radiation to reach the active sensing element. The sensing element comprises a thermocouple with its cold junction attached to the first reference substrate. An additional passive secondary detector is allowed to receive IR radiation from the first reference substrate, so the offset is compensated by subtracting the signal of the additional detector from the signal of the active sensing element.

However, in practice, the parasitic contributions and the offset are not completely eliminated. For instance, the signals of the active and passive detectors may not compensate optimally due to differences in the characteristic and construction of the sensing elements. This may result in an offset value existing even when no object of interest (no heat source) is present.

SUMMARY OF THE INVENTION

It is an object of embodiments of the present invention to provide an infrared sensor for temperature measurement with offset correction and controllable sensitivity of active primary and passive secondary sensors used to tune the compensation.

The above objective is accomplished by a method and a device according to embodiments of the present invention.

In a first aspect, the present invention provides an infrared sensor for temperature sensing. The infrared sensor comprises a cap covering a substrate. Such coverage of the substrate by the cap can have different implementations: for instance the cap can be attached directly to the substrate, or it can be attached to the substrate with a carrier in between, for instance a thermally conductive carrier such as a metallic carrier, an IR-radiation filtering window in the cap, the window being transparent to IR radiation from a source external to the cap,
a first sensing element, comprising a set of N thermocouples on the substrate covered by the cap, whose hot junctions may receive radiation from a source external to the sensor,
a second sensing element comprising a set of N thermocouples on the substrate covered by the cap whose hot junctions may not receive (are prevented from receiving) radiation from a source external to the sensor,
first connection modules for connecting a first number N1 of thermocouples of the first sensing element, second connection modules for connecting a second number N2 of thermocouples of the second sensing element, the first number N1 and the second number N2 being equal or smaller than N, at least one of the numbers N1 or N2 being smaller than N, N1 being different from N2;
connecting means for connecting an output of the first connection modules of the first sensing element with an output of the second connection modules of the second sensing element, and an output for outputting the combined outputs of the sensing elements.

It is an advantage of embodiments of the present invention that the offset and sensitivity of the sensor may be adjusted. It is a further advantage of embodiments of the present invention that the active thermopiles (formed by the thermocouples of the first sensing element) and the passive thermopiles (formed by the thermocouples of the second sensing element) may share cap and substrate.

An infrared sensor according to embodiments of the present invention may further comprise blocking means in or on the cap for isolation of the second sensing element from radiation from a source external to the cap, for instance a reflective coating or a layer which is non-transparent to IR radiation.

It is an advantage of embodiments of the present invention that the active and passive thermopiles may have a same configuration and geometry while contributing differently to the output signal.

In an infrared sensor according to embodiments of the present invention, the hot junctions of the thermocouples of the first and second sensing elements may be attached to a first and second IR-absorbent membrane, respectively, the membranes being isolated from the substrate, and the cold junctions of the thermocouples of the first and second sensing elements may be attached to the substrate. This is advantageous as the hot junctions absorb heat more efficiently.

The membranes may be attached to the substrate by means of beams. This is, however, not a requirement for the present invention. It can also be a closed membrane (no beams). The use of beams improves hot junction isolation from the cold junction.

In an infrared sensor according to embodiments of the present invention, the first and second connection modules may comprise switching means, for instance transistors.

In an infrared sensor according to embodiments of the present invention, the first and second connection modules may comprise hardwiring. Active components are not necessary in every connection.

In an infrared sensor according to embodiments of the present invention, the second sensing element may receive radiation from the cap but may not receive radiation from a source external to the sensor. The sensor offset may be reduced from the contribution of the cap to the signal.

An infrared sensor according to embodiments of the present invention may further comprise a number i of sensing elements, each provided with N thermocouples, Ni of which are connectable to a connection module connectable to the output of the infrared sensor. This way, the sensitivity of the detector may be further controllable.

In a second aspect, the present invention provides a method of calibration of an infrared sensor according to any of the embodiments of the first aspect of the present invention. The method comprises the steps of:
measuring the temperature of a heat source with at a predetermined temperature by means of the infrared sensor,
comparing an output signal of the infrared sensor representative for the measured temperature with a corresponding value representative for the predetermined temperature,
if the output signal of the infrared sensor differs more than a predetermined value from the value representative for the predetermined temperature, adjusting the number of connected thermocouples N1, N2 in the first and second sensing elements, and
repeating the measuring and comparing and adjustment steps until the output signal of the infrared sensor differs no more than a predetermined value from the value representative for the predetermined temperature.

It is an advantage of embodiments of the present invention that the calibration method is fairly easy to implement.

A method of calibration according to embodiments of the present invention may further comprise repeating the calibration method for at least another predetermined temperature.

In a third aspect, the present invention provides a method of calibration of a temperature sensor according to any of the embodiments of the first aspect of the present invention. The method comprises the steps of:
measuring the output of the first sensing element whose hot junctions may receive radiation from a source external to the sensor, when no such source external to the sensor is present,
measuring the output of the second sensing element whose hot junctions may not receive radiation from a source external to the sensor,
connecting a number N2 of thermocouples of the second sensing element to a connection module, connecting a number N1 of thermocouples of the first sensing element to a connection module, wherein N2 is lower than N1 if the output of the second sensing element is higher than the output of the first sensing element, and vice versa.

A method according to embodiments of the third aspect of the present invention may further comprise any of the method steps of embodiments of the second aspect of the present invention.

In a fourth aspect, the present invention provides a method of temperature measurement by IR radiation sensing, comprising the steps of:
exposing a detector to a heat source external to the detector,
substantially filtering radiation except for IR radiation,
absorbing IR radiation by the hot junctions of N thermocouples of a first sensing element exposed to the heat source external to the detector,
absorbing IR radiation by the hot junctions of N thermocouples of a second sensing element not exposed to the heat source external to the detector,
obtaining signals from the first and second sensing element, combining the signal from the first sensing element in a connection module using a first number N1 of thermocouples, less than all thermocouples of the first sensing element ($N1 \leq N$),
combining the signal from the second sensing element in a connection module using a second number N2 of thermocouples, less than all thermocouples of the second sensing element ($N2 \leq N$),
subtracting the combined signal of the second sensing element from the combined signal of the first sensing element by combining the output of the connection module coupling N1 of the N thermocouples of the first sensing element with the output of the connection module coupling N2 of the N thermocouples of the second sensing element, N1 and N2 being equal or smaller than N, and at least one of the numbers N1 or N2 being smaller than N, obtaining the combined electric signal as a readable output.

It is an advantage of embodiments of the present invention that control of the sensor temperature compensation is enabled.

Before exposing the detector to the heat source external to the detector, any of the calibration steps of any of the methods of the second and third aspect may be applied.

It is an advantage of embodiments of the present invention that signal from the temperature of the cap is avoided.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
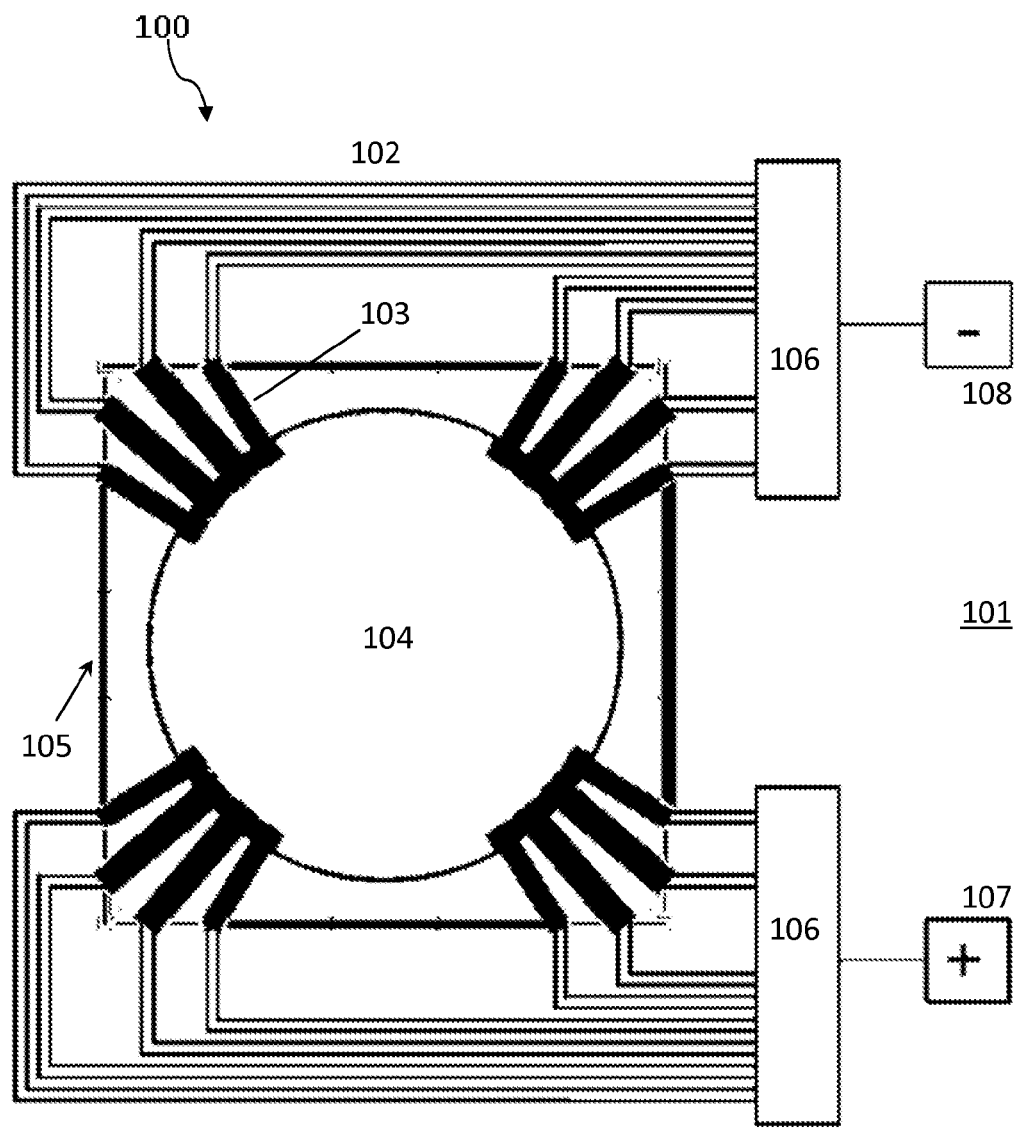
FIG. 1 shows a sensing element comprising a set of thermocouples forming a thermopile.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Figure 5:
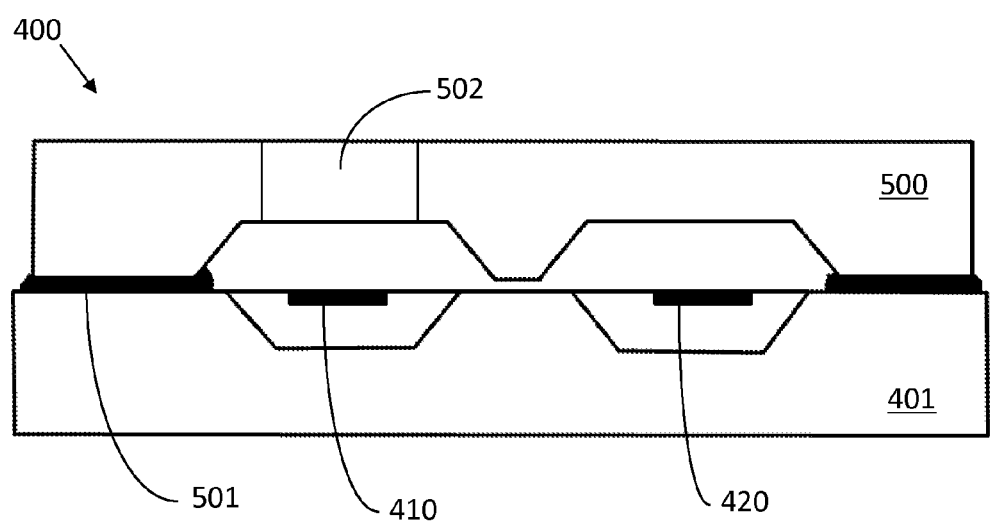
FIG. 5 is a schematic side view of an infrared sensor according to embodiments of the present invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "cap", reference is made to a cover of a sensor, protecting and isolating the sensing element, which may not be in direct contact with the cap. An exemplary cap 500 is illustrated in FIG. 5

The sensing element 410, 420, which is the element acting as heat sink, may be included in or attached to a substrate 401. Embodiments of the present invention may comprise at least one sensing element 410 for receiving radiation from a source external to the detector of which it is the goal to measure the temperature. Such sensing element will be referred to as the "active sensing element" or simply "active element". Embodiments of the present invention may further comprise at least one sensing element 420 for receiving radiation from a source other than a source external to the detector. This radiation is not related to the source which has to be measured and is to be considered as an error signal. Analogously to the previous one, such sensing element is referred to as "passive sensing element" or "passive element". Such sensing element may for instance receive radiation from the substrate itself onto which both the active sensing element and the passive sensing element are built or mounted, or from the cap 500 or package encapsulating the sensing elements 410, 420.

The cap 500 and the substrate 401 may be directly bonded to one another by any suitable method, such as for instance by solder 501, glass frit, resin, die attach film. As an alternative embodiment, the substrate 401 may be bonded to a carrier, for instance a thermally conductive carrier, and the cap 500 is connected to that carrier. Advantageously a thermally conductive element may be used as bonding element. Both cap 500 and substrate 401 may encapsulate one or more sensing elements 410, 420. The cap may comprise a window 502 for filtering radiation, blocking substantially all radiation that is not IR radiation.

According to embodiments of the present invention, the cap 500 may comprise a plurality of cavities for encapsulation of sensing elements. Said sensing elements may comprise a plurality of isothermal sensors, for example a thermopile comprising a plurality of thermocouples.

In a first aspect, the present invention relates to an IR temperature sensor 400. Such temperature sensor may be a separately packaged sensor (for example a monolithic packaged sensor) comprising IR sensors, or a Multi-Chip Module, System in Package, sensor arrays or packages or the like, or it may be comprised in a processing circuit like an integrated circuit, although embodiments of the present invention are not limited thereto. By way of illustration, embodiments of the present invention not being limited thereto, an exemplary temperature sensor according to an embodiment of the present invention is further described with reference to FIG. 1 to FIG. 4, illustrating exemplary configurations.

The temperature sensor may comprise two or more sensing elements. According to embodiments of the present invention, the sensing elements may comprise a thermopile. The sensing element 100 shown in FIG. 1 comprises a substrate 101, a set of thermocouples 102 and beams 103, supporting a membrane 104, which is otherwise isolated from the bulk substrate 101 by a pit 105 underneath it. Membrane 104 and pit 105 may be formed simultaneously by isotropic or anisotropic underetching and masking, following for example standard techniques. The thermocouples 102 extend from the substrate 101 to the membrane 104 through the beams 103. The hot junctions of the thermocouples 102 lay on the membrane 104, while the cold junctions lay on the substrate 101. Further, the thermocouples 102 may advantageously be connected to a connection module, like a multiplexer 106, although the present invention is not limited thereto. The output of the thermopiles 102 is given by the contacts 107, 108.

Figure 2:
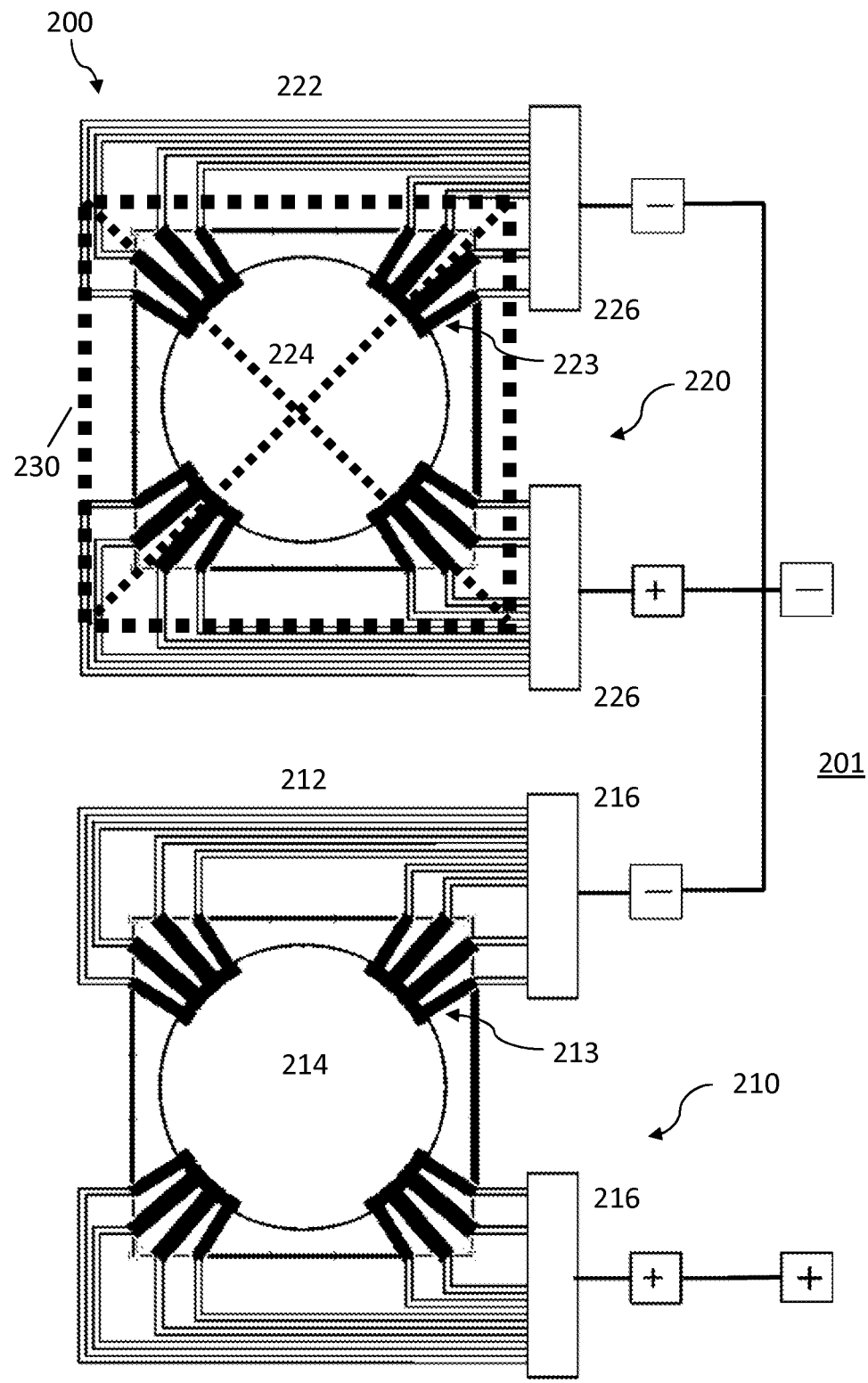
FIG. 2 shows a pixel formed by two sensing elements, one active and one passive, with connected thermopiles.

One or more substantially identical sensing elements may be connected in series with the first sensing element via the thermocouples output. The example shown in FIG. 2 shows the sensing portions 200 of a temperature detector, comprising a substrate 201, an active sensing element 210 and a passive sensing element 220, both covered by a cap (not shown). The active sensing element 210 may receive IR radiation from a heat source outside of the cap, for example through a filtering window in the cap which may advantageously be transparent to IR radiation. As before, membranes 214, 224 connected to the hot junctions of thermocouples 212, 222 are attached, through bridges 213, 223 to the common substrate 201 and connection modules 216, 226. According to embodiments of the present invention, the passive element 220 may be shielded from outside radiation. The shield 230 may form part of the cap, for instance it may be a coating provided on a surface of the cap. Alternatively or in combination therewith, it may comprise a membrane attached to the cavity or on the cap, or a pattern, a mirror, a combination of several other features, or any other feature that blocks radiation, including IR radiation. Hence, the passive sensing element 220 will sense the heat from its surroundings (for example the heat emitted by the cap or by the substrate 201) but will substantially not sense outside radiation.

The thermocouples 212 of the active sensing element 210 may be connected to connection modules 216 with a positive and a negative output. The measurement of the active sensing element 210 may have a parasitic contribution, e.g. from the temperature of the cap. The negative output may be compensated by connecting it to the outputs of connection modules 226 connected to the thermocouples 222 of the passive sensing element 220, which sense only the parasitic contribution, e.g. from the temperature of the cap. This parasitic contribution to the heat received by the active sensor 210 may then be isolated and subtracted. In practice this subtraction is not perfect as the parasitic influences are not necessarily the same for both the active and passive sensor. Furthermore, the two sensing elements are not perfectly equal, and other contributions, like unequal gradients, may be present. The offset is not optimally reduced.

Figure 3:
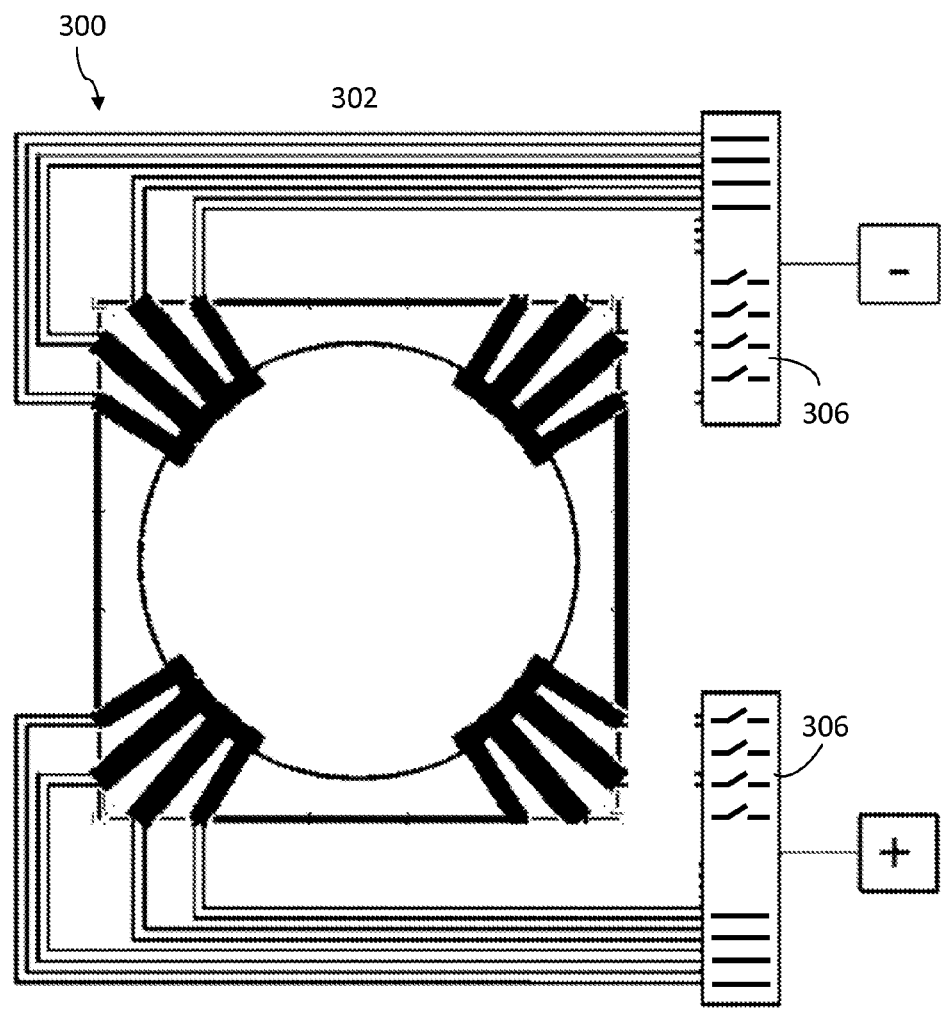
FIG. 3 shows a sensing element according to embodiments of the present invention, comprising a set of thermocouples, some of which do not contribute to the temperature sensing.

In embodiments of the present invention, this subtraction can be controlled. The connection of thermocouples 212, 222 may be selective. As can be seen in the sensing element 300 in FIG. 3, the connection modules 306 may selectively connect less than all thermocouples 302 of the thermopile to the output nodes. In the particular embodiment shown in FIG. 3, only half of the thermocouples 312 are connected and contribute to the output signal. Any suitable type of connection may be used, for example it can be done by hardwiring, by active components like transistors, switches, etc. The connection between the thermocouples 302 and the output node may be a series connection or a parallel connection. The inactive thermocouples may be completely removed from the sensing elements, as shown in FIG. 3, although in advantageous embodiments of the present invention they may not be removed, hence leaving them coupled to the beams of the membrane but not connecting them in the connection module 306. Hence, the physical characteristics of the sensing element may be as invariant as possible. This is of particular importance when comparing the outputs of two sensing elements which should be physically as similar as possible.

Figure 4:
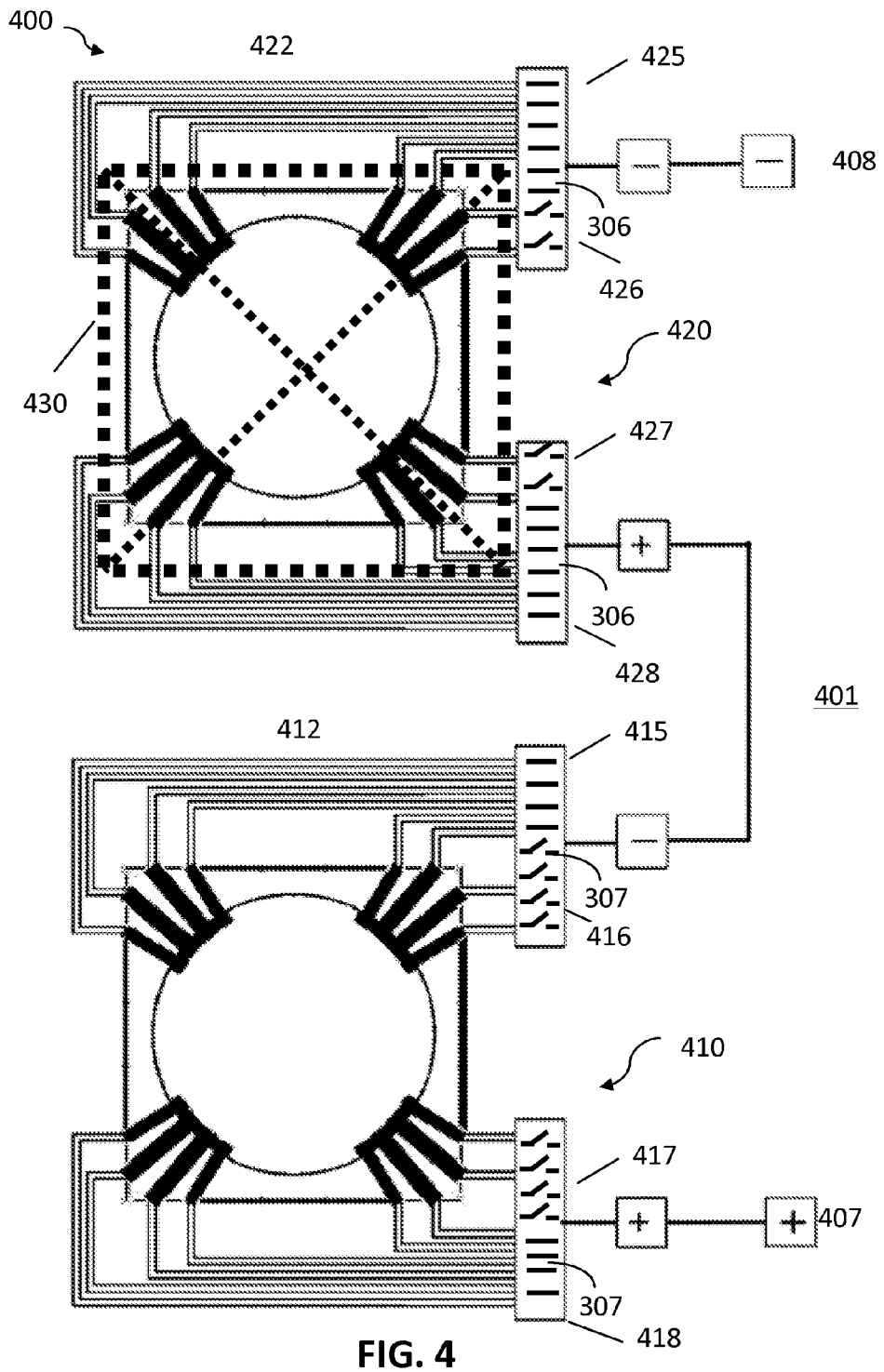
FIG. 4 shows a pixel formed by an active and a passive sensing element, comprising a fraction of connected thermocouples.

FIG. 4 shows the sensing portions 400 of a temperature detector embedded in a substrate 401 and a blocking shield 430 blocking all external radiation to the passive sensing element 420, according to embodiments of the present invention. As an exemplary embodiment, 75% of the thermocouples 422 of the passive sensing element 420 are connected and half of the thermocouples 412 of the active sensing element 410 are connected. The open lines and connections, respectively, are represented by the open circuits 426, 427, 416, 417 and short-circuits 425, 428, 415, 418 in the connection modules 306, 307. In embodiments of the present invention, the thermocouples of a sensing element are connected in parallel with one another to the output node. In FIG. 4, the negative (or reference) output of the connection modules 307 of the active element 410 is connected in series with the positive and negative output of the connection modules 306 of the passive element 420. The positive output of the active element 410 forms the positive output 407 of the temperature sensor. The negative output 408 of the temperature sensor is connected to the negative outputs of the connection modules 306 of the passive sensing element 420. The negative contact of the connection module 307 of the active sensing element 410 and the positive contact of the connection module 306 of the passive sensing element 420 are also connected. The number of thermocouples connected may be different in different embodiments, for instance less thermocouples from the passive element than from the active element may be connected. Using fewer than all thermocouples allows a great freedom of parameter control.

Particular embodiments of the present invention exhibit additional features. As a particular example, additional sensing elements may be provided, for instance, a number i of sensing elements advantageously similar between each other, at least one of which is active and at least one of which is passive. For instance, a temperature sensor according to embodiments of the present invention may comprise 3 or more sensing elements similar to the ones illustrated in FIG. 3 In this way it can be possible to connect two active and one passive sensing element and still have the compensation matched by having more thermopiles on the passive sensing element. Moreover, additional features like amplifiers, comparators, etc. may be added to embodiments of the present invention, for performing standard signal processing on measurement signals.

Embodiments of the present invention may have a functionality as described hereinafter. The heat absorbed by the active sensing element (Eas) depends on:

sensing element characteristics in relation to the object of interest (area of absorber and emitter, field of view, geometric and material characteristics, etc), represented by $\alpha_1$;

sensing element characteristics in relation to the cap covering the sensing elements, represented by $\alpha_2$.

Temperature $T_1$ of the object of interest, heat source external to the detector.

Temperature $T_2$ of the cap covering the sensing elements.

Temperature $T_{as}$ of the active sensing element.

On the other hand, the heat absorbed by the passive sensing element ($E_{ps}$), which is isolated from the object of interest, depends on:

sensing element characteristics in relation to the cap, represented by $\alpha_3$.

Temperature $T_2$ of the surrounding elements, for instance the cap covering the sensing elements.

Temperature $T_{ps}$ of the passive sensing element.

The transfer of energy is regulated by the expressions:

$$E_{as}=\alpha_1*(T_1^4-T_{as}^4)+\alpha_2*(T_2^4-T_{as}^4)$$

$$E_{ps}=\alpha_3*(T_2^4-T_{ps}^4)$$

The transferred energy is the cause of the temperature difference between the sensing element and the substrate which depends on the thermal resistance between the sensing element and the substrate $R_{th}$. This temperature difference may cause a voltage in the thermocouple (for the active sensing element, $V_{as}$, and for the passive sensing element, $V_{ps}$) depending on the sensitivity S of the sensing element. Since the sensing elements are substantially identical, the thermal resistance and the sensitivity of the sensing elements are expected to be the same. Therefore, the only difference between the active and the passive sensing elements is the absorbed energy. The voltages are obtained with the expressions:

$$V_{as}=E_{as}*R_{th}*S$$

$$V_{ps}=E_{ps}*R_{th}*S$$

It is possible to isolate the contribution of the temperature of the cap from the temperature of the object of interest received by the active sensing element.

The output voltage of the isolated active sensing element includes the absorbed energy of the object and surrounding elements, like the cap. Therefore the voltage of the active sensing element is also dependent on the temperature of the surrounding elements, e. g. the cap.

The output voltage of the passive sensing element is only dependent on the temperature difference between the cap and the sensing element. The temperature of the object can be obtained by subtracting a fraction of the passive element signal of the active element signal.

$$V_{result}=V_{as}-p*V_{ps}$$

$$V_{result}=(E_{as}*R_{th}*\text{sens})-(p*E_{ps}*R_{th}*\text{sens})$$

$$V_{result}=(\alpha_1*(T_1^4-T_{as}^4)+\alpha_2*(T_2^4-T_{as}^4))*R_{th}*S-(p*\alpha_3*(T_2^4-T_{ps}^4))*R_{th}*S$$

For the resulting voltage to be independent of the cap temperature, the following equation should be true:

$$(\alpha_2*(T_2^4-T_{as}^4))=(p*\alpha_3*(T_2^4-T_{ps}^4))$$

The temperature of the sensing elements can be approximated to the bulk temperature T0. The previous equation simplifies to:

$$\alpha_2=p*\alpha_3$$

As the coefficients $\alpha_2$ and $\alpha_3$ are inherently different (due to small differences of manufacture, and also due to the presence of a shielding means to block all radiation to the passive sensing element, the difference must be compensated by the factor p.

By reducing the amount of thermocouples in the sensing elements which are switched in the sensing circuit, the sensitivity of both sensing elements may be manipulated. The fraction of thermocouples of the active sensing element and the thermocouples of the passive sensing element would provide with a variable p. At the same time, all thermocouples are still present in both elements, thus ensuring that the sensing elements remain as much as possible the same.

In the example shown in FIG. 4, only half of the thermocouples of the active sensing element are connected, hence the sensitivity is reduced to half; and ¾ of the thermocouples of the passive element are taken so the sensitivity is reduced to 75% of its original value. This results in the equation:

$$V_{result}=(E_{as}*R_{th}*0.5*S)-(E_{BLIND}*R_{th}*0.75*S)$$

By substitution with the previous equations and again approximating the temperature of the sensing elements to the bulk temperature T0, it can be seen that the factor p is equal to the division of the sensitivity factors.

$$\alpha_2 = \frac{0.75}{0.5}*\alpha_3$$

A different number of thermocouples may provide a different factor p, according to the particular needs.

Additionally, more elements (active or passive) may be added to the detector, enabling a greater control of the sensitivity of the output.

In a second aspect of the present invention, a method is presented for driving and calibrating the temperature sensor according to embodiments of the first aspect. Embodiments of the second aspect of the present invention comprise determining, with respect to the total, the ratio or fraction of thermocouples of the active element to be connected to the output, and determining, with respect to the total, the ratio or fraction of thermocouples of the passive element to be connected to the output. Embodiments of the present invention deal with sensors comprising an active sensing element and a passive sensing element, the present invention not being limited thereto. Alternative embodiments within the present invention include more than one active sensing element and more than one passive sensing element, for instance for two active sensing elements and one passive sensing element. The number of active sensing elements and the number of passive sensing elements does not need to be the same. There may be more or less active sensing elements than passive sensing elements.

A method of calibration according to embodiments of the present invention may comprise obtaining a signal output from the active sensing element and obtaining a signal output from the passive sensing element, for one or more temperatures, by exposing the detector to an external heat source at different temperatures, comparing both readings and adjusting the connected number of thermocouples N1 of the active sensing element and the connected number of thermocouples N2 of the passive sensing element until the average error between actual and measured temperature is minimized at each heat source temperature.

A second method of calibration according to embodiments of the present invention, which can be combined with the first method of calibration, comprises correcting the sensitivity of the sensing elements by obtaining a signal output from the active sensing element and obtaining a signal output from the passive sensing element when substantially no heat source external to the detector is present. This can be performed, for example, by exposing the detector inside a black body, like the hole of a hollow black cavity. The difference between the two outputs can be compensated by adjusting the connected number of thermocouples N1 of the active sensing element and the connected number of thermocouples N2 of the passive sensing element until the error between both outputs is smaller than a predetermined value, for instance smaller than 10%, for example smaller than 1%. For example, the connected number of thermocouples N1 of the active sensing element may be higher than the connected number of thermocouples N2 of the passive sensing element if the signal of the active sensing element is lower than the signal of the passive sensing element, or vice-versa.

The method of calibration is valid also in cases where more than two sensing elements are used. In this case either multiple sensors can be used to compensate one sensor, or one sensor can be used to compensate multiple active sensors.

The voltage comparison (comparing output voltages) may comprise the use of other instruments, e.g. comparators. The adjustment of the number of connected thermocouples may be done by connecting in series the connected number of thermocouples N1 of the active sensing element and the connected number of thermocouples N2 of the passive sensing element by hard-wiring or by switching means, by transistors like CMOS or BJT, or logical gates, the present invention not being limited thereto.

A method of temperature measurement according to embodiments of the present invention may comprise calibrating, according to one or both methods of calibration presented in accordance with embodiments of the present invention, a temperature sensor according to embodiments of the first aspect of the present invention. The detector may be then exposed to a heat source external to it, which may comprise substantially filtering radiation except for IR radiation. This filtering may be done with the cap, or with a filtering window comprised in the cap, the present invention not being limited thereto. A further step of the method comprises absorbing IR radiation by an active sensing element, for example by the hot junctions of N thermocouples of a first thermopile exposed to a heat source, for example by hot junctions attached to a membrane acting as a heat sink. A further step comprises absorbing IR radiation by a passive sensing element, for example the hot junctions of N thermocouples of a thermopile. The passive sensing element may not be exposed to the heat source external to the detector. The circuit configuration then allows for subtraction of the signal of the passive sensing element from the signal of the active sensing element by combining the output of a series connection of N1 of the N thermocouples of the active sensing element with the output of a series connection of N2 of the N thermocouples of the passive sensing element, N1 and N2 being equal or smaller than N, and at least one of the numbers N1 or N2 being smaller than N. For example, the positive output of the active sensor may act as a positive output of the detector, while the negative output (or reference) may be connected in series with the negative output of the passive sensing element.

The invention claimed is:

1. An infrared sensor for temperature sensing comprising a cap covering a substrate,
   an IR-radiation filtering window in the cap, the window being transparent to IR radiation from a source external to the cap,
   a first sensing element, comprising a set of N thermocouples on the substrate covered by the cap, whose hot junctions may receive radiation from a source external to the sensor,
   a second sensing element comprising a set of N thermocouples on the substrate covered by the cap whose hot junctions may not receive radiation from a source external to the sensor,
   first connection modules for connecting a number N1 of thermocouples of the first sensing element, second connection modules for connecting a number N2 of thermocouples of the second sensing element, the number N1 and the number N2 being equal or smaller than N, at least one of the numbers N1 or N2 being smaller than N, N1 being different from N2;
   connecting means for connecting an output of the first connection modules of the first sensing element with an output of the second connection modules of the second sensing element, and
   an output for outputting the combined outputs of the first and second sensing elements.

2. The infrared sensor according to claim 1, further comprising blocking means in the cap for isolation of the second sensing element from radiation from a source external to the cap.

3. The infrared sensor according to claim 1, wherein the hot junctions of the thermocouples of the first and second sensing elements are attached to a first and second IR-absorbent membrane, respectively, the membranes being isolated from the substrate, and the cold junctions of the thermocouples of the first and second sensing elements being attached to the substrate.

4. The infrared sensor according to claim 3, wherein the membranes are attached to the substrate by means of beams.

5. The infrared sensor according to claim 1, wherein the first and second connection modules comprise switches.

6. The infrared sensor according to claim 1, wherein the first and second connection modules comprise hardwiring.

7. The infrared sensor according to claim 1, wherein the second sensing element may receive radiation from the cap but may not receive radiation from a source external to the sensor.

8. The infrared sensor according to claim 1, further comprising a number i of sensing elements, each provided with N thermocouples, Ni of which are connectable to a connection module connectable to the output of the infrared sensor.

9. A method of calibration of an infrared sensor according to claim 1, comprising the steps of:
   measuring the temperature of a heat source with at a predetermined temperature by means of the infrared sensor,
   comparing an output signal of the infrared sensor representative for the measured temperature with a corresponding value representative for the predetermined temperature,
   if the output signal of the infrared sensor differs more than a predetermined value from the value representative for the predetermined temperature, adjusting the number of connected thermocouples N1, N2 in the first and second sensing elements, and
   repeating the measuring and comparing and adjustment steps until the output signal of the infrared sensor differs no more than a predetermined value from the value representative for the predetermined temperature.

10. The method of calibration according to claim 9, further comprising repeating the calibration method for at least another predetermined temperature.

11. A method of calibration of a temperature sensor according to claim 1, comprising the steps of:

measuring the output of the first sensing element whose hot junctions may receive radiation from a source external to the sensor, when no such source external to the sensor is present, measuring the output of the second sensing element whose hot junctions may not receive radiation from a source external to the sensor, connecting a number N2 of thermocouples of the second sensing element to a connection module, connecting a number N1 of thermocouples of the first sensing element to a connection module, wherein N2 is lower than N1 if the output of the second sensing element is higher than the output of the first sensing element, and vice versa.

12. The method of calibration according to claim 11, further comprising the method steps including:

measuring the temperature of a heat source with at a predetermined temperature by means of the infrared sensor, comparing an output signal of the infrared sensor representative for the measured temperature with a corresponding value representative for the predetermined temperature, if the output signal of the infrared sensor differs more than a predetermined value from the value representative for the predetermined temperature, adjusting the number of connected thermocouples N1, N2 in the first and second sensing elements, and repeating the measuring and comparing and adjustment steps until the output signal of the infrared sensor differs no more than a predetermined value from the value representative for the predetermined temperature.

13. A method of temperature measurement by IR radiation sensing, comprising the steps of:

exposing a detector to a heat source external to the detector, substantially filtering radiation except for IR radiation, absorbing IR radiation by the hot junctions of N thermocouples of a first sensing element exposed to the heat source external to the detector, absorbing IR radiation by the hot junctions of N thermocouples of a second sensing element not exposed to the heat source external to the detector, obtaining signals from the first and second sensing elements, combining the signal from the first sensing element in a connection module using N1 thermocouples, $N1 \leq N$, combining the signal from the second sensing element in a connection module using N2 thermocouples, $N2 \leq N$, subtracting the combined signal of the second sensing element from the combined signal of the first sensing element by combining the output of the connection module coupling N1 of the N thermocouples of the first sensing element with the output of the connection module coupling N2 of the N thermocouples of the second sensing element, N1 and N2 being equal or smaller than N, and at least one of the numbers N1 or N2 being smaller than N, obtaining the combined electric signal as a readable output.

14. The method of claim 13, further comprising, before exposing the detector to the heat source external to the detector, performing the calibration steps including:

measuring the output of the first sensing element whose hot junctions may receive radiation from a source external to the sensor, when no such source external to the sensor is present, measuring the output of the second sensing element whose hot junctions may not receive radiation from a source external to the sensor, connecting a number N2 of thermocouples of the second sensing element to a connection module, connecting a number N1 of thermocouples of the first sensing element to a connection module, wherein N2 is lower than N1 if the output of the second sensing element is higher than the output of the first sensing element, and vice versa.

* * * * *